United States Patent [19]
Dorgebray

[11] 3,778,613
[45] Dec. 11, 1973

[54] PIPE-LINE LEAK DETECTION METHOD AND DEVICE

[75] Inventor: Gerard Dorgebray, la Chaussee-d Ivry, France

[73] Assignee: Elf Union, Paris, France

[22] Filed: Apr. 9, 1971

[21] Appl. No.: 132,641

[30] Foreign Application Priority Data
Apr. 17, 1970   France .............................. 7014071

[52] U.S. Cl. 250/43.5 MR, 250/43.5 FC, 250/106 T
[51] Int. Cl. ........................................... G01n 23/12
[58] Field of Search .............. 250/43.5 FC, 43.5 MR, 250/106 T

[56] References Cited
UNITED STATES PATENTS
3,045,116  7/1962  Gant ............................ 250/43.5 MR
3,060,315  10/1962  Scherbatskoy ............... 250/43.5 FC
3,064,127  11/1962  Green et al. ................. 250/43.5 MR Primary Examiner—Archie R. Borchelt
Attorney—Dunner, Lane, Aitken & Ziems

[57] ABSTRACT

For detecting and locating leaks in subterranean pipe lines which transport fluids, a radioactive tracer is circulated in the line, the line is flushed and a detection pig is moved along the line. A counting assembly in the pig monitors the radioactivity along the line and the distance from the starting point is printed each time the radioactivity exceeds a predetermined threshold.

14 Claims, 3 Drawing Figures

PATENTED DEC 11 1973 3,778,613
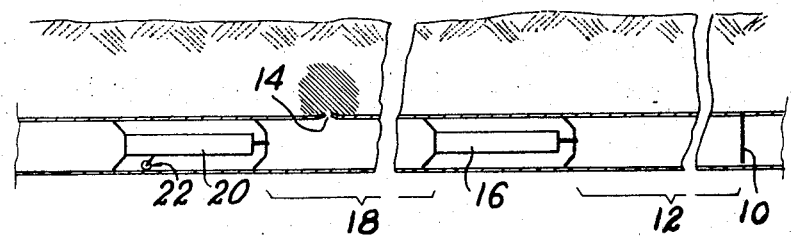
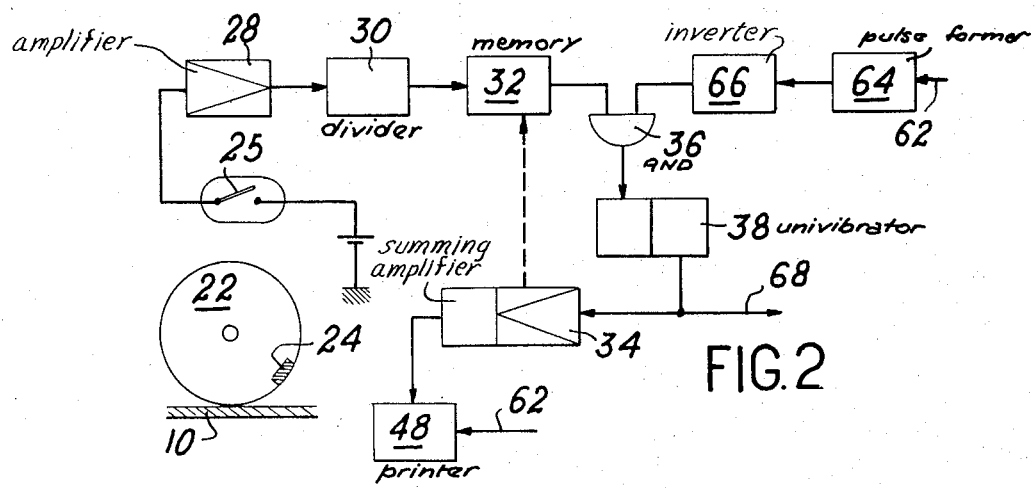
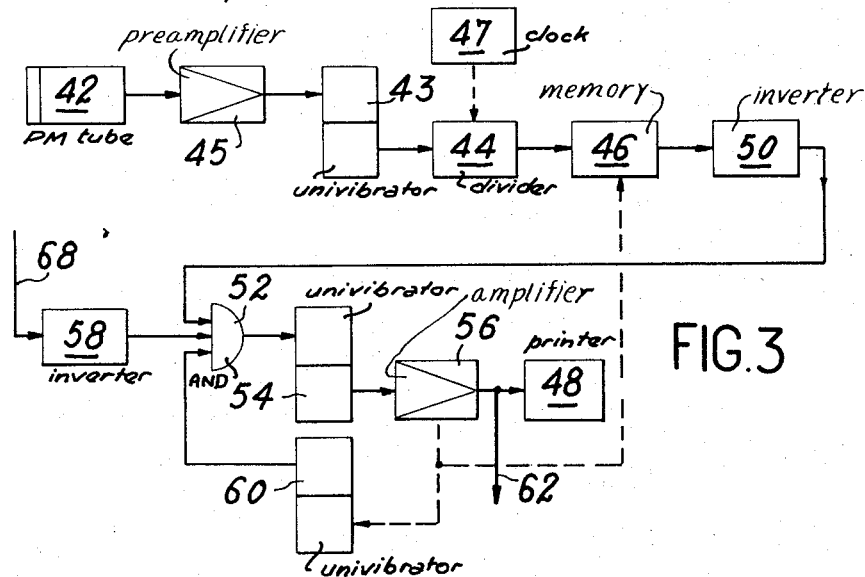
INVENTOR
GÉRARD DORGEBRAY
BY Lane, Aitken, Dunner & Ziems
ATTORNEYS

PIPE-LINE LEAK DETECTION METHOD AND DEVICE

BACKGROUND OF THE INVENTION

This invention relates to the detection and location of leaks in a subterranean pipe line used for conveying fluids and especially liquid or gaseous hydrocarbons, and is based on the use of radioactive tracers, which are carried along the line by a volume of the fluid and which escape at the same time as this latter through any leaks which may be present in the pipe.

There are already a number of methods for detecting leakage in oil pipe lines by making use of radioactive tracers. According to these methods a volume of carrier fluid in which a radioactive tracer has been dispersed (usually in the form of a solution) is passed through the pipe line; the pipe is flushed and if necessary a scraper piston or "pig" is passed within the pipe for removing practically the entire tracer content from the pipe; finally a detector "pig" or piston is moved along the line in order to detect the points at which the tracer has sorbed in the soils surrounding the pipe after escaping from this latter through leaks at the same time as the carrier fluid.

The prior art methods and devices have not proven wholly satisfactorily, either because they do not permit accurate localization of leaks (this being the case with pigs which provide localization only by reference to outside radioactive distance markers which are spaced along the conduit at predetermined locations or by measurement of time intervals) or because they provide indications which involve long or difficult later processing (this being the case with pistons which provide a record of the measured activity vs. distance).

SUMMARY OF THE INVENTION

It is an object of the invention to improve upon the earlier methods and devices; for this purpose, a "slug" of fluid in which is dispersed a tracer containing a high-energy gamma emitter having a half-life at least equal to the time of passage of the volume within the pipe is circulated in the pipe line and the line is flushed being said "slug" and then a detection pig is circulated along the pipe; contrary to the prior art, the continuous measurement taken of the displacement of said detection piston from a predetermined point or origin is only recorded when the activity at the point reached by the piston exceeds a predetermined threshold.

A better understanding of the invention will be gained from the following description of an embodiment which is given by way of non-limitative example.

BRIEF DESCRIPTION OF THE DRAWINGS

The description refers to the accompanying drawings, wherein:

FIG. 1 is a schematic diagram showing the succession of passages within the pipe to be tested;

FIG. 2 is a block diagram of the channel for computing the distance traveled by the detection scraper piston;

FIG. 3 is a block diagram which also represents schematically the channel which controls the printing of distances of travel.

DESCRIPTION OF THE PREFERRED EMBODIMENT

The method which will now be described by way of example is intended for the detection of leaks in a buried oil pipeline although it is also applicable to the case of a gas pipeline. As in the methods of the prior art, the initial step consists in circulating within the pipe a volume of fluid which is loaded with radioactive tracer so that, in the event of leakage, this latter escapes into the surrounding soil and is sorbed thereon, whereupon the interior of the conduit is freed from any tracer which may remain therein and the zones of residual radioactivity are finally detected by means of a piston which is displaced within the conduit.

If the pipeline exhibits a leak having a rate $d$ which is very low with respect to the main flow rate $D$, a quantity of activity $a$ which is a fraction of the injected activity $A$ escapes through the leak and impregnates the soil at the leak point and we have the relation which is independent of the conditions of injection:

$$a = d/D \; A$$

In order that the radioactivity which is due to the tracer may be differentiated from the environmental activity, the invention proposes two criteria: on the one hand, the signals delivered by the detector are taken into consideration only if they correspond to an energy radiation of higher value than a threshold which exceeds the energy of the greater part of radiations which constitute the background, thus evidently entailing the need to use a tracer which emits high-energy gamma radiation. Moreover, the position of the detector piston is recorded only when the intensity which is detected after energy discrimination exceeds an adjustable level chosen as a function of the natural radioactivity of the ground through which the pipeline passes.

The radioactive element must evidently have a fairly long half-life in order to permit its use but nevertheless fairly short in order to prevent long-lived residual radioactivities when it is received at the refinery. Bromine-82 which is a gamma emitter of 0.8 –1 MeV having a half-life of 36 hours is usually suitable, in particular when the time of travel through the pipe does not exceed a few tens of hours. The tracer is then an organic compound of bromine such as metadibromobenzene which is soluble in petroleum products and especially in crude oil. It is preferable to add nonene to the metadibromobenzene in order to prevent formation of free bromine. It is possible in particular to make use of a mixture in equal parts of dibromobenzene and nonene which is miscible in all proportions in the hydrocarbons and activated by irradiation in a quartz ampoule.

In the case of an oil pipeline having a flow rate of 1,000 cubic meters per hour, it is apparent that, by injecting an activity of one curie (which it is sufficient to dilute in 300 cubic meters of crude in order to bring the concentration to the permissible level in drinking water), a leak rate of 3 liters per hour results in release of an activity of 3 microcuries into the surrounding land.

The sequence of operations is accordingly as illustrated in FIG. 1 : a volume 12 of fluid loaded with tracer is first passed through the pipe 10 and displaced as a single unit so as to form a plug. A fraction of the tracer is deposited on the internal wall of the conduit but remains sufficiently small to ensure that there is not any appreciable reduction in the activity of the plug 12 from one end of the pipe to the other. This phenomenon can in any case be limited by circulating in front of the volume 12 a volume of liquid which is loaded with the same tracer but not activated. As it passes opposite to a leak 14, the tracer escapes into the surrounding land at the same time as the fluid and is permanently sorbed on the soil.

A brush-type scraper piston 16 is passed behind the volume 12 followed by a rinsing volume 18 which will usually consist of products normally carried by the pipe and evidently injected without tracer. The passage of the piston 16 and the volume 18 within the pipe causes the tracer which is deposited in the pipe 10 to be carried away so that the residual activity which is measured along the pipe will then depend only on that of the surrounding land. Finally, the measuring scraper piston 20 will be passed through the conduit.

The scraper piston 20 has a conventional external appearance and comprises a leak-tight cylindrical body which is capable of affording resistance to the pressure within the pipe and on which are fitted sealing cups. There are disposed within the body a channel which serves to measure the distance covered by the piston, a channel which serves to measure the activity and initiate printing of the distance covered and batteries which ensure sufficient autonomy of operation.

As shown in FIG. 2, the channel for counting the distance of travel comprises an odometer wheel 22 which is rotatably mounted on the body of the piston 20. Transmission of data supplied by the wheel to the electronic circuits which are placed within the piston body is ensured by magnetic and electric means: the odometer wheel 22 carries a magnetized rod 24 and, on completion of each revolution of the wheel, said rod passes in front of a magnetic-control microswitch 25 which is normally open and closes under the action of the magnetic field. The microswitch 25 which is placed within a sealed ampoule is connected to an amplifier 28 which emits a pulse each time the switch closes: if the development of the wheel 22 is 0.2 meter, for example, there will accordingly be an emission of one pulse at each interval corresponding to a length of run of 0.2 meter. The number of pulses is divided by 5 in a divider 30 which supplies a summing amplifier 34 for totalizing the distance of travel. This supply is not carried out directly but by means of an inhibition circuit which prevents summation during the periods of printing and by means of a memory device 32 which is necessary to store the data received from the divider 30 during the inhibition periods.

The inhibition circuit comprises an AND gate 36, one input of which is connected to the memory device 32 and the second input of which is connected by means of a double inverter 40 to a circuit which will be described hereinafter and which maintains a signal during the printing operations. There is placed between the output of the AND gate 36 and the summing amplifier 34 a lengthening circuit constituted by a monostable multivibrator 38, the function of which is to maintain the signal applied during the period of time which is necessary for excitation of the summing amplifier. Said amplifier delivers a reset signal to the memory device 32 as soon as summation has been completed (dashed line in FIG. 2) and displaces the drum of a printer 48, the operation of which is initiated by the activity measurement channel.

The activity measurement and printing control channel which is shown diagrammatically in FIG. 3 comprises by way of detector element a photomultiplier-scintillator assembly 42 which could in any case be replaced by any other type of detector for delivering output pulses having a height which is proportional to the energy of the detected radiation emanating from the photomultiplier, said pulses being amplified, shaped and employed for controlling the printer 48.

As indicated in the foregoing, the activity measurement channel is provided for the purpose of counteracting the background (arising from the internal noise of the circuits and from normal environmental radioactivity) by means of a double discrimination both in intensity and in energy. Moreover, the use of a printer as a recording device entails additional requirements. On the one hand, it is necessary to limit the rate of impression of the printer in order to avoid damage to this latter if the rate of impression imposed by the detected environmental radioactivity exceeds the possibilities of the machine, such a high rate being in any case only subject to disadvantages since it would simply result in lengthening of the recording to no useful purpose.

Furthermore, the printing must be prohibited during summing operations, that is to say during changes of data which are supplied to the printer by the channel which is shown diagrammatically in FIG. 2.

The energy selection (elimination of pulse heights which are lower than a given threshold) is carried out by employing a shaping circuit in the form of a monostable multivibrator 43 having a time constant of the order of 3 microseconds and supplied by the preamplifier 45 of the photomultiplier tube 42. Said monostable multivibrator has a threshold below which it does not change state and the gain of the preamplifier 45 is adjusted so that the pulses resulting from the tracer exceed only to a small extent the minimum height which is necessary.

The energy discrimination which is effected does not eliminate the entire background noise and it is necessary to define a count rate threshold which is slightly higher than the environmental radioactivity in the absence of tracer in order to prevent indication of nonexistent leakage. To this end, the shaped signal is applied to a divider 44 having a capacity of 16 and provided with a zero-reset input which is excited by a clock signal 47 having a frequency such that the background pulses are insufficient in number to produce a signal at the output of the divider 44. If an incident signal is superposed on the background, a signal appears at the output of the divider 44 and permits printing of a distance datum.

It is evidently the frequency of the clock 47 which defines the threshold of sensitivity; in the case of a clock pulse frequency of 10 c/s, the threshold is 160 pulses per second. Since the environmental background is a function of the ground through which the pipe passes, it may prove necessary to reduce the sensitivity if the pipe passes through particularly "active" soils. This result is achieved by increasing the clock pulse frequency.

As has been mentioned in the foregoing, it would serve no useful purpose and have disastrous effects on the printer if this latter were to print the distance at the maximum rate since the presence of a leak causes the divider 44 to emit signals at a frequency which is far beyond the capacity of the printer 48.

In order to limit said rate and to prevent printing during distance summing operations, the divider drives the printer-control input only through a data-holding memory device 46, an inverter 50 and a three-input AND-gate 52.

The output of said gate 52 feeds a lengthening circuit consisting of a monostable multivibrator 54 which holds information during a period of 80 msecs, for example, and the printer amplifier 56 controls the operation of the printer 48.

In order to prevent printing during summation on the distance-counting channel, a signal is collected at the output of the monostable multivibrator 38 which has a holding time of 25 msecs, for example, said signal being applied to the second input of the AND circuit 52 after passing through an inverter 58.

In order to limit the rate of impression, provision is made for a delay loop which closes on the third input of the AND circuit. Said loop comprises a monostable multivibrator 60 which holds an inhibition signal for a period of 250 msecs each time it is triggered by the trailing edges of the drive pulses of the amplifier 56. Said period of 250 msecs corresponds to a rate of four strokes per second which is usually wholly sufficient. The same passage of the trailing edge resets the memory device 46 to zero (dashed line in FIG. 3).

The printing signals which are emitted by the amplifier 56 in the conductor 62 (FIGS. 2 and 3) are applied to the inhibition circuit of the distance-counting channel which comprises a lengthening circuit 64 (monostable multivibrator which delivers a square-wave signal having a width of 80 milliseconds, for example) and an inverter circuit 66. The signal delivered to the conductor 68 via the output of the monostable multivibrator 38 is applied in a symmetrical manner to the inverter 58 and prevents printing during the summing operation.

The operation of the device has become clear from the foregoing description and will accordingly be given only in brief outline. While the piston 20 moves within the pipe 10, the amplifier 34 summates the pulses received from the divider 30 and causes the drum of the printer 48 to rotate step by step so as to indicate the distance over which the piston has traveled. At the same time, the photomultiplier-scintillator assembly 42 delivers pulses which arise from the environmental radioactivity and, in the event of leakage, from the tracer which is sorbed around the pipe. The greater part of the pulses resulting from environmental radioactivity is eliminated by the triggering threshold of the monostable multivibrator 45. The frequency of the residual pulses is insufficient to cause output pulses to appear in the divider 44. On the other hand, if the detected activity becomes such that an output signal appears in the divider 44, an impression takes place either immediately or with a time-lag which cannot exceed the length of the square-wave signals delivered by the monostable multivibrator 38 (25 msecs, for example) if a summing operation is in progress. The corresponding error is negligible since the displacement of the piston over a time interval of 25 msecs which corresponds to a possible error is only 7 cm in respect of a rate of displacement 3 m/sec which is practically a maximum value.

If the divider 32 continues to deliver high-frequency signals as a result of detection of high activity (resulting from the tracer and from the low contribution of the background at high energy), the impression rate is accordingly limited by the length of the square-wave signals derived from the monostable multivibrator 60.

The results supplied by the device will therefore be presented in the form of a table which does not contain any indication if no leakage has been detected and with a list of distances expressed in meters if a leak has been detected: the same distance can evidently be printed several times in succession in view of the fact that, in the case of slow displacements of the piston, the impression rate is such that there are several impressions for a single displacement of 1 meter.

The advantages of the invention over the prior art are readily apparent. The recording which is provided only contains indications if leaks have been detected and processing is immediate. This is not the case with a table which gives the activity detected along the entire length of the conduit. Location of leaks is extremely accurate by virtue of recording of distances and not of elapsed time intervals which necessarily entails the assumption that the speed of the piston is constant. Energy discrimination ensures high sensitivity. The leak rate can be assessed on the basis of the number of successive impressions on the list. Moreover, the application of the invention does not disturb the operation of the pipeline.

I claim:

1. A method of pipe line leak detection and location comprising the steps of injecting a carrier fluid in which is dispersed a tracer material containing a high-energy gamma emitter having a half-life at least equal to the time of passage of the carrier fluid within the pipe, passing a flushing fluid within the pipe line behind said carrier fluid, introducing a detection pig into and passing it through said pipe line, continuously measuring the displacement of said detection pig from the point of introduction and the activity at the location reached by the pig and printing the actual displacement of the pig from said point of introduction only when the measured activity exceeds a predetermined level.

2. A method according to claim 1, comprising energy discriminating the radiations and measuring the activity of those radiations having an energy which is higher than the discriminating threshold.

3. A method according to claim 2, wherein bromine-82 is employed as tracer.

4. A device for detecting and locating leaks in a subterranean pipe line through which a gamma emitting radioactive tracer has displaced into the earth adjacent said leaks, comprising: a pig; odometer means carried by said pig and permanently providing a measurement of the distance travelled by said pig; gamma radiation counting means including detector means and energy discriminating means and providing an output only when the count rate contributed by said tracer exceeds a predetermined level and printing means controlled by said counting means and recording said measurement only when said output is provided by said energy discriminating means.

5. A device according to claim 4, wherein the detector means comprises a scintillator, a photomultiplier operatively associated with said scintillator, and discriminator means receiving pulses from said photomultiplier and passing only those pulses which exceeds a predetermined threshold lower than the maximum energy of said gamma tracer.

6. A device according to claim 5, wherein the pulse-height discriminating means comprises a univibrator.

7. A device for detecting and locating local concentrations of a radioactive tracer emitting penetrating radiations adjacent to a pipe line, comprising: a pig; odometer means carried by said pig and permanently providing an indication of the distance travelled by said pig; radioactivity detection means in said pig providing pulses whose height is in direct relation with the energy of the radioactivity; means including pulse height discriminator means coupled to said detector means for selecting counts produced by said tracer; activity discriminating means coupled to said pulse height discriminator means for providing an output only when the count rate received from said pulse height discriminator means exceeds a predetermined threshold; a printing means controlled by said activity discriminating means for recording said indication only when said output is provided by said energy discriminating means.

8. A device according to claim 7, wherein said activity discriminating means comprises a pulse rate divider coupled to the output of the pulse-height discriminator and having a reset input, a clock applying periodic signals to said reset input, said divider being constructed to deliver an output signal each time it receives a number of pulses equal to its capacity during the time interval which elapses between two successive clock signals.

9. A device according to claim 7, wherein said odometer comprises distance measurement means carried by the pig and cooperating with the pipe line for providing an electrical pulse each time the pig has moved along the line by a predetermined extent and summation means for recording the number of pulses received from said distance measurement means.

10. A device according to claim 7, wherein the odometer comprises a wheel which runs on the internal wall of said pipe line and operates at each revolution a microswitch which supplies a pulse-summation circuit.

11. A device according to claim 8, wherein said summing amplifier provides an indication of the distance over which the piston has travelled to said printing means.

12. A device according to claim 9, having inhibition circuit means for delaying operation of the printer when a summing operation is in progress until completion of summation of the distance of travel.

13. A device according to claim 8, comprising means for providing a circuit for inhibition of the summing means when said printing means is in operation and until completion of the printing.

14. A device according to claim 9 or any one of the dependent claims, wherein a circuit prevents printing for a predetermined period of time after completion of the previous printing.

* * * * *